J. & P. COURTIER.
APPARATUS FOR PRODUCING FLASHES BY THE ELECTRIC VOLATILIZATION OF FUSIBLE WIRES.
APPLICATION FILED FEB. 16, 1918.
1,274,009.
Patented July 30, 1918.
5 SHEETS—SHEET 1.
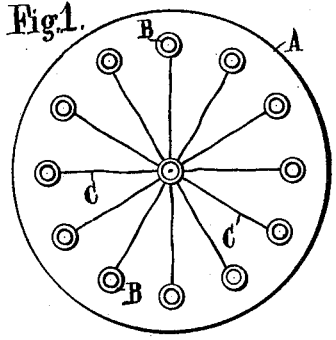
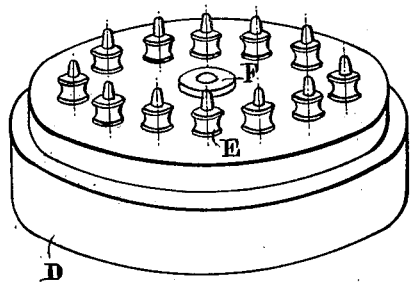
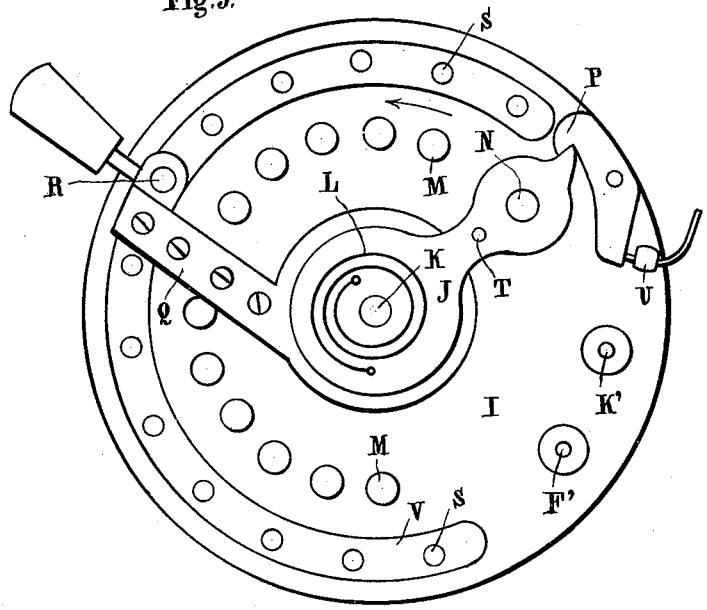
INVENTORS:
Jules Courtier and Pierre Courtier
By Emil Bonnelycke
ATTORNEY J. & P. COURTIER.
APPARATUS FOR PRODUCING FLASHES BY THE ELECTRIC VOLATILIZATION OF FUSIBLE WIRES.
APPLICATION FILED FEB. 16, 1918.
1,274,009.
Patented July 30, 1918.
5 SHEETS—SHEET 2.
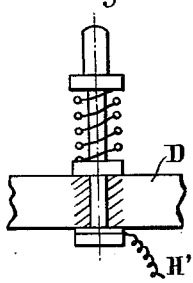
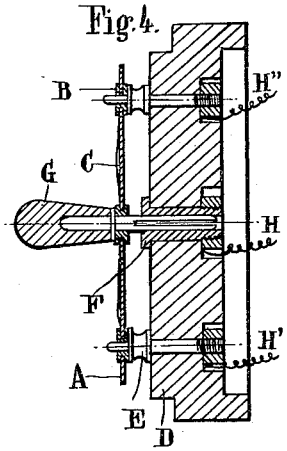
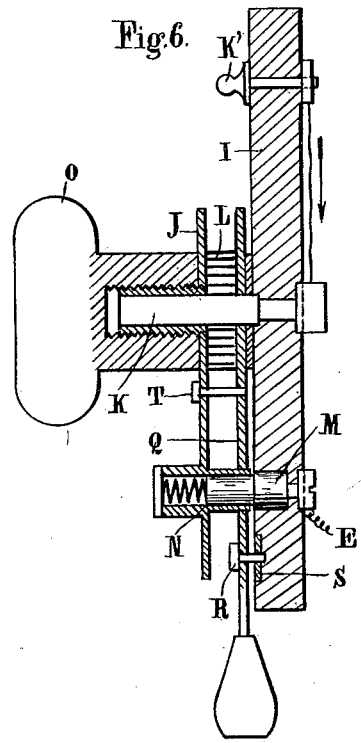
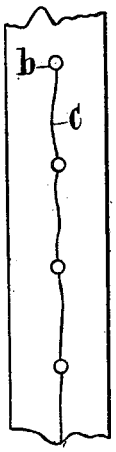
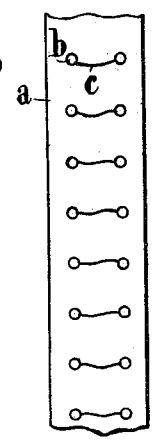
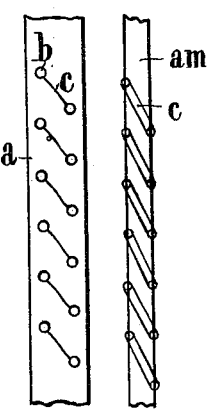
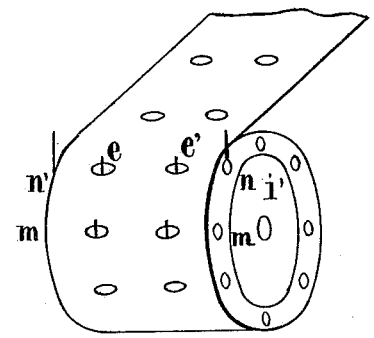
INVENTORS:
Jules Courtier and Pierre Courtier
By Émile Rouviely
ATTORNEY

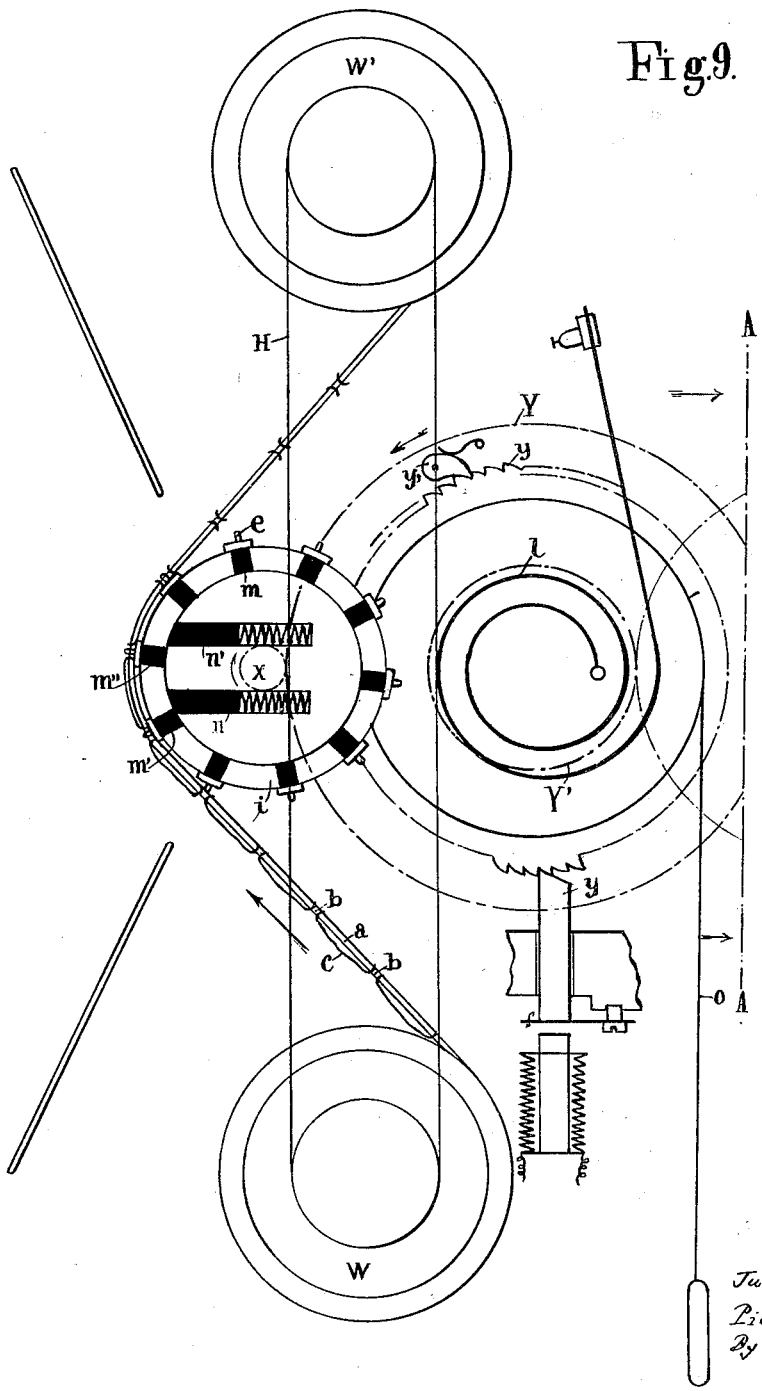

J. & P. COURTIER.
APPARATUS FOR PRODUCING FLASHES BY THE ELECTRIC VOLATILIZATION OF FUSIBLE WIRES.
APPLICATION FILED FEB. 16, 1918.
1,274,009. Patented July 30, 1918.
5 SHEETS—SHEET 4.
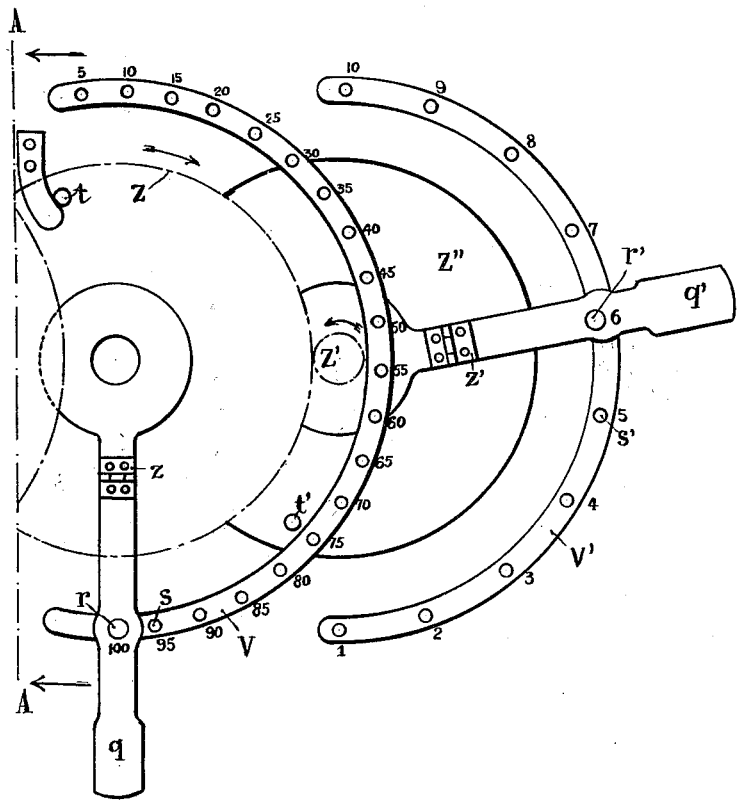
Fig. 9.ª
INVENTORS:
Jules Courtier and Pierre Courtier
By
ATTORNEY

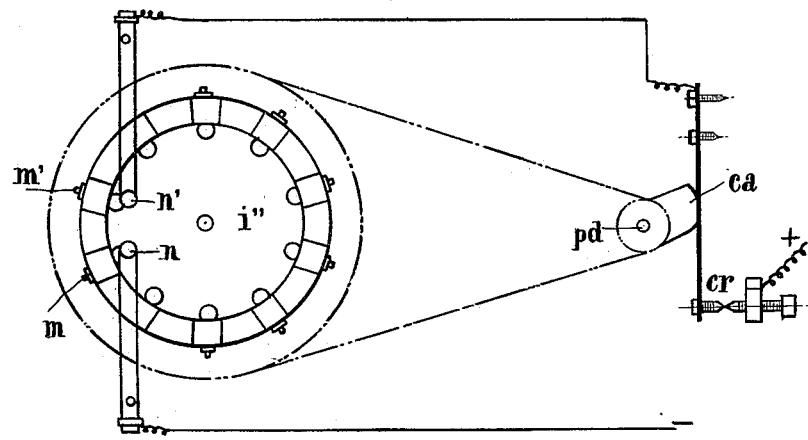
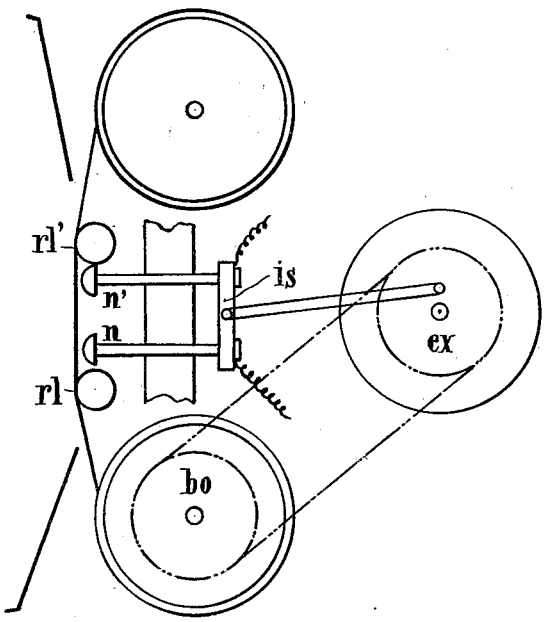

UNITED STATES PATENT OFFICE.

JULES COURTIER AND PIERRE COURTIER, OF PARIS, FRANCE.

APPARATUS FOR PRODUCING FLASHES BY THE ELECTRIC VOLATILIZATION OF FUSIBLE WIRES.

1,274,009.             Specification of Letters Patent.      Patented July 30, 1918.

Application filed February 16, 1918.    Serial No. 217,639.

*To all whom it may concern:*

Be it known that we, JULES COURTIER and PIERRE COURTIER, two citizens of the Republic of France, and residents of Paris, France, (post-office address 20 Rue Ernest Cresson,) have invented new and useful Improvements in Apparatus for Producing Flashes by the Electric Volatilization of Fusible Wires, which improvements are fully set forth in the following specification.

This invention relates to certain improvements in apparatus for producing flashes, used for taking photographs, by electric volatilization of fusible wires.

These improvements chiefly consist in mounting the fusible wires by means of eyelets on an insulating support of any desired shape, provided with conducting plugs with which the eyelets engage in any desired manner, and to which the electric current that has to pass through the wires, is supplied in any desired manner.

In the accompanying drawing—

Figure 1 is a front elevation of a cardboard disk on which are mounted the metal wires;

Fig. 2 is a perspective view of a disk on which can be mounted the disk shown in Fig. 1;

Fig. 3 is a detail view of one of the contact plugs of the disk shown in Fig. 2;

Fig. 4 is a section of the disk shown in Fig. 2 on which is mounted the cardboard carrying the metal wires;

Fig. 5 is a plan showing a current distributer, and

Fig. 6 is a section of the same.

Figs. 7 and 8 relate to a modified construction in which the fusible wires are mounted on an endless band.

Figs. 9 and 9$^a$ show the apparatus with which can be used the bands shown in Figs. 7 and 8;

Figs. 10 and 11 relate to a second modified method of mounting the wires on an endless band;

Fig. 12 is a view of the drum for driving the band shown in Figs. 10 and 11;

Fig. 13 shows a device for driving the band shown in Figs. 7 and 8; and

Figs. 14 and 15 show finally a last modified construction.

Fig. 1 shows a cardboard A to which the metal wires C are secured by means of eyelets B. Each of the said wires connects separately an eyelet at the circumference of the cardboard, to the central eyelet.

Fig. 2 shows a disk D of an insulating material, intended to support the cardboard A. It has at its periphery as many metal contact plugs E as there are eyelets at the circumference of the cardboard. In the center of the said disk is shown a metal socket F provided with a hole into which is introduced a movable plug G (Fig. 4).

The plugs E could be provided with a spring as shown in Fig. 3. Fig. 4 shows in section the cardboard A placed on the disk D. At the top and bottom of the said section is shown a metal contact plug passing through an eyelet B, and in the center of the section the metal part F into which is jammed the movable plug G.

The eyelets B of the cardboard A rest therefore each on a plug E, and the central plug G presses the central eyelet of the said cardboard on the part F, insuring by its pressure good contact of the other eyelets B with the plugs E. It will be seen in the same figure that from the base of the plugs E and of the part F start electric wires H, H$^1$, H''.

Fig. 5 shows a current distributer constituted by a disk of insulating material I. In the center of the said disk is mounted on a pivot K a part J. The pivot K is secured to a spring L which drives in a circle the part J in the direction shown by the arrow. This pivot is connected by means of a rotatable pin K$^1$ of the disk I to one of the poles of the current. Contacts M of the same number as that of the plugs E and eyelets B, are arranged in a circle on the disk I in such a manner that the brush N of the part J when rotated by the spring L, comes successively into contact with each of them. Each of the contacts M of the distributer I is separately connected in the body of the apparatus to a plug E of the disk D. On the other hand, the central part F of the disk D is connected to the second pole of the current through the rotatable pin F$^1$ of the disk I.

It will be seen therefore that the brush

N of the slider, in passing over the contacts M, will successively close the electric circuit over each of the fusible wires of the cardboard A, since these wires form temporarily a bridge between the two poles.

*Working of the apparatus.*

The part J carries a button O (Fig. 6) by means of which the spring L is cocked until the end of the slide J engages with a pawl P (Fig. 5).

On the disk I, below the part J and the button O, is mounted a slide Q (Figs. 5 and 6) provided with a projection R which can be secured in one or the other of the holes S of the limb V (Fig. 5) extending around the circumference of the disk I. The part J is provided with a tappet T which the slide Q is intended to stop when the released part J accomplishes its revolution under the impulse of the spring L.

It will be seen, therefore, that when the pawl P has been released by means of a Bowden cable U or in some other manner, the brush N will close electric circuit only on a certain number of contacts determined beforehand. The rotatable pins $K^1$ and $F^1$ form, as already stated, terminals for the current. It goes without saying, however, that the terminals could be of any other construction than that of rotatable pins (plugs, binding screws, etc.).

Instead of being secured to a disk A, the fusible wires C could be secured to a flexible insulating band $a$ by means of eyelets $b$ (Fig. 7, front elevation, and Fig. 8, section of the band, eyelets and wires).

The disk I will be replaced by an insulating wheel $i$ provided with contacts $m$ surmounted by conductor plugs $e$ intended to receive the eyelets $b$ of the band $a$ (Fig. 9).

Fixed brushes $n$ and $n^1$ suitably arranged at a distance apart, and each connected to one pole of the current, will close the electric circuit on the fusible wires $c$ when the movement of the wheel $i$ will bring two consecutive contacts $m'$ and $m''$ respectively to contact with the brushes $n$ and $n^1$.

The band $a$ provided with fusible wires, will be stored on a spool W; it will pass over the wheel $i$ and will be received, after volatilization of the wires, by a spool $W^1$ connected to the spool W by an endless chain H.

The driving of the band $a$ is effected in the following manner:

A toothed wheel Y carries a spring $l$ secured to a ratchet wheel $y$ provided with a pawl $y^1$. A chain $o$ enables the spring $l$ to be cocked until, when the spring is fully wound, a pawl $y''$ is caused to engage with a notch of the ratchet wheel. The wheel Y drives a toothed pinion X in the center of the wheel $i$.

It will be seen, therefore, that the wheel Y,—on the pawl $y''$ being disengaged by means of an electromagnet (or in any other way),—started by the spring $l$, will drive the wheel X and, by means of the eyelets $b$, plugs $e$ and contacts $m$, successively bring the ends of the fusible wires $c$ in contact with the brushes $n$ and $n^1$, and that the said wires taken in short-circuit, will be volatilized, a flash being produced. By way of example, the pinion X makes ten revolutions for one revolution of the wheel Y. If the wheel X has ten contacts $m$, 100 wires will be volatilized for each complete revolution of the wheel Y.

But new parts make it possible, as in the device first described, to limit at will the number of wires to be volatilized.

At the side opposite the spring $l$, the wheel Y, carries a reducing toothed wheel $Y^1$. The said wheel $Y^1$ acts on a toothed wheel Z, and the wheel Z acts in its turn on a toothed pinion $Z^1$ secured to a disk $Z''$. The wheel Z has a slide $q$ provided with a projection $r$ which can be fixed (without acting on the wheel Z) in any desired one of the holes $s$ of the limb V. The wheel Z has a projection $t$ which, at a given moment, strikes the arm of the slide $q$.

The wheel $Z''$, on the other hand, has a slide $q^1$ provided with a projection $r^1$ which can (without acting on the toothed pinion $Z^1$ secured to the wheel $Z''$) be fixed in any one of the holes $s^1$ of the limb $V^1$.

The wheel $Z''$ has a projection $t^1$ which, at a given moment, strikes the arm of the slide $q^1$.

By way of example, the diameters of the toothed wheels or pinions X, Y, $Y^1$, Z and $Z^1$ are so calculated that: (1) Z makes half-a-revolution for a complete revolution of Y and $Y^1$, and for ten revolutions of X, and (2) $Z^1$ makes half-a-revolution for a complete one of X.

In such conditions, one hundred wires will be volatilized per half a revolution of Z, and ten wires will be volatilized for half a revolution of $Z^1$.

The limb V is divided by the holes $s^1$ into ten equal parts. If, therefore, the projection $r^1$ of the slide $q^1$ is fixed at the division 6, six wires will be volatilized. The limb V is divided by the holes $s$ into twenty equal parts, each controlling therefore volatilization of five wires.

If it is desired to volatilize 45 wires, the projection $r$ is placed in the 9th division. The tappet $t$ will stop the movement of Z at this point on meeting the arm of the slide $q$. If it is desired to volatilize 75 wires, the projection $r$ will be placed in the 15th division, and so on.

It goes without saying that in order to utilize the pinion $Z^1$, the slide $q$ will be completely disengaged by folding it about its hinge $z$, and that in order to utilize the wheel Z, the slide $q^1$ will be completely disengaged by folding it about its hinge $z^1$.

In order to volatilize more than one hundred wires, both $q$ and $q^1$ will be disengaged, the spring $l$ allowed to act on Y until it is completely expanded, the pawl $y''$ being kept away from the ratchet wheel $y$.

If it is desired to go still further as regards the number of volatilizations, all the above conditions must be complied with, and the wheel $W^1$ operated by means of a crank.

By way of example, Figs. 10 and 11 show other arrangements of wires on the flexible band, necessitating a modification of the part $i$.

In such a case, the wheel $i$ assuming the dimensions of the cylinder $i'$ (Fig. 12) will comprise two parallel series of plugs $e$, and the brushes $n$ and $n^1$ will rub laterally against contacts $m$ emerging at the base of the cylinder $i^1$.

It will be seen that with the band construction according to Fig. 7, a short circuit could be obtained by the system shown in Fig. 13. A cam $c\ a$ (Fig. 13) secured to a toothed pinion $pd$ connected to the wheel $i''$ by an endless chain, will close the circuit at $cr$ when the contacts $n$ and $n^1$ will be brought in contact with the contacts $m$ and $m^1$.

Another construction of the system (Fig. 14) comprises an insulating wire $am$ for instance of asbestos, on which is wound in a continuous manner an annealed fusible wire $c$ fixed here and there by eyelets. Two contacts $n$ and $n^1$ (Fig. 15) are mounted on an insulating support $is$, and each is connected to one pole of the current. This support $is$ is controlled by an eccentric $ex$ connected by an endless chain to a spool $bo$ unwinding the wire $am$ on two insulating rollers $rl$ and $rl'$. The parts must be calculated so that the contacts $n$ and $n^1$ close the circuit on the coils of the wire $c$ whenever this wire has advanced to an extent equal to the distance between the contacts $n$ and $n^1$

Claims:

1. An apparatus for producing flashes by electric volatilization of fusible wires, comprising fusible wires mounted by means of eyelets on any desired insulating support, a second support comprising conductor plugs for receiving the eyelets, a current distributer with contacts connected to the plugs, brushes collecting the current and a device for limiting the number of wires volatilized at each operation.

2. An apparatus for producing flashes by electric volatilization of fusible wires, comprising fusible wires mounted by means of eyelets on a disk of insulating material, each wire connecting an eyelet at the circumference to a single central eyelet, a second support comprising conducting plugs for receiving the eyelets, a current distributer with contacts connected to the plugs, current-collecting brushes and a device for limiting the number of wires volatilized at each operation.

3. An apparatus for producing flashes by electric volatilization of fusible wires, comprising fusible wires mounted by means of eyelets on a disk of insulating material, each wire connecting an eyelet at the circumference to a single central eyelet, a disk of insulating material with metal plugs corresponding to the eyelets, a central orifice with movable plugs insuring contact, electric wires connected to the said plugs, a current distributer with contacts connected to the plugs, current-collecting brushes and a device for limiting the number of wires volatilized at each operation.

4. An apparatus for producing flashes by electric volatilization of fusible wires, comprising fusible wires mounted by means of eyelets on a disk of insulating material, a second support comprising conducting plugs for receiving the eyelets, the said plugs being connected to contacts on which can move a brush controlled by the action of a spring which can be cocked, and a device for limiting the number of wires volatilized at each operation.

5. An apparatus for producing flashes by electric volatilization of fusible wires, comprising fusible wires mounted by means of eyelets on any desired insulating support, a second moving support comprising conducting plugs for receiving the eyelets, a current distributer with contacts connected to the plugs, traveling over current collecting brushes, movable slides limiting the travel to a number of given contacts.

6. An apparatus for producing flashes by electric volatilization of fusible wires comprising fusible wires mounted by means of eyelets on any desired insulating support, a second moving support comprising conducting plugs for receiving the eyelets, a current distributer with contacts connected to the plugs traveling over brushes collecting the current closed by means of a cam or an eccentric.

In testimony whereof we have signed this specification in the presence of two subscribing witnesses.

JULES COURTIER.
PIERRE COURTIER.

Witnesses:
CHARLES LEON SOISEL.
JHLES TOUSSEL.

Copies of this patent may be obtained for five cents each, by addressing the "Commissioner of Patents, Washington, D. C."